US010894927B2

(12) United States Patent
Karvo et al.

(10) Patent No.: US 10,894,927 B2
(45) Date of Patent: Jan. 19, 2021

(54) ALKYLATE GASOLINE COMPOSITION WITH RENEWABLE NAPHTHA AND ISO-OCTANE

(71) Applicant: Neste Oyj, Espoo (FI)

(72) Inventors: Anna Karvo, Porvoo (FI); Ari Engman, Porvoo (FI); Tuukka Hartikka, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 16/339,901

(22) PCT Filed: Oct. 5, 2017

(86) PCT No.: PCT/EP2017/075327
§ 371 (c)(1),
(2) Date: Apr. 5, 2019

(87) PCT Pub. No.: WO2018/069137
PCT Pub. Date: Apr. 19, 2018

(65) Prior Publication Data
US 2020/0048569 A1 Feb. 13, 2020

(30) Foreign Application Priority Data
Oct. 13, 2016 (FI) ..................................... 20165785

(51) Int. Cl.
*C10L 1/06* (2006.01)
(52) U.S. Cl.
CPC ......... *C10L 1/06* (2013.01); *C10L 2200/0423* (2013.01); *C10L 2200/0469* (2013.01); *C10L 2270/023* (2013.01); *C10L 2270/08* (2013.01); *C10L 2290/24* (2013.01)
(58) Field of Classification Search
CPC .............. C10L 1/06; C10L 2200/0423; C10L 2200/0469; C10L 2270/023; C10L 2270/08; C10L 2290/24
See application file for complete search history.

(56) References Cited

U.S. PATENT DOCUMENTS

| | | | |
|---|---|---|---|
| 6,451,075 B1 | 9/2002 | Schoppe et al. | |
| 9,428,697 B2 | 8/2016 | Zhou | |
| 2002/0045785 A1* | 4/2002 | Bazzani | C10L 1/023 585/14 |
| 2006/0052650 A1 | 3/2006 | Thebault et al. | |
| 2009/0277078 A1 | 11/2009 | Schweiger et al. | |
| 2009/0299109 A1* | 12/2009 | Gruber | C10L 1/06 585/14 |
| 2010/0326410 A1 | 12/2010 | Yeh et al. | |
| 2011/0114536 A1 | 5/2011 | Demoment | |
| 2011/0319683 A1 | 12/2011 | Abhari et al. | |
| 2012/0116138 A1 | 5/2012 | Goodall et al. | |
| 2012/0157734 A1 | 6/2012 | Strege et al. | |
| 2013/0131360 A1* | 5/2013 | Abhari | C07C 9/14 554/1 |
| 2014/0046103 A1 | 2/2014 | Abhari et al. | |
| 2015/0175921 A1 | 6/2015 | Shea et al. | |

FOREIGN PATENT DOCUMENTS

| | | |
|---|---|---|
| CN | 1301291 A | 6/2011 |
| CN | 104745244 A | 7/2015 |
| DE | 19744109 A1 | 4/1999 |
| EP | 2368968 A1 | 9/2011 |
| GB | 1293085 A | 10/1972 |
| JP | 2007-16090 A | 1/2007 |
| JP | 2007-254665 A | 10/2007 |
| JP | 4634104 B2 | 2/2011 |
| WO | 9743356 A1 | 11/1997 |
| WO | 9949003 A1 | 9/1999 |
| WO | 0222766 A1 | 3/2002 |
| WO | 2009148909 A2 | 12/2009 |
| WO | 2011061776 A1 | 5/2011 |

OTHER PUBLICATIONS

California Air Resource Board, Proposed New Temporary Fuel Pathway—Renewable Naphtha, 2019, pp. 1-3. (Year: 2019).*
Pearson Fuels blends ethanol, renewable naphtha into advanced E85. Biomassmagazine.com, 2019 (Year: 2019).*
International Search Report (PCT/ISA/210) and Written Opinion (PCT/ISA/237) dated Dec. 19, 2017, by the European Patent Office as the International Searching Authority for International Application No. PCT/EP2017/075327.
Office Action (Communication) dated Apr. 7, 2020, by the European Patent Office in corresponding European Patent Application No. 17784603.7. (34 pages).
Office Action (Notice of Reasons for Refusal) dated Jun. 9, 2020, by the Japanese Patent Office in corresponding Japanese Patent Application No. 2019-518996, and an English Translation of the Office Action. (4 pages).
Office Action dated Sep. 25, 2020, by the Chinese Patent Office in corresponding Chinese Patent Application No. 2017800621916. (2 pages).

* cited by examiner

*Primary Examiner* — Cephia D Toomer
(74) *Attorney, Agent, or Firm* — Buchanan Ingersoll & Rooney PC

(57) ABSTRACT

Processes for making alkylate gasoline compositions that are more "green" and alkylate gasoline compositions containing "green" renewable naphtha and iso octane are described. Exemplary processes for making alkylate gasoline compositions that are more "green" and compositions of alkylate gasoline compositions containing "green" renewable naphtha, iso octane and iso pentane are described. Such compositions allow a higher mixing ratio of the renewable naphtha and/or a higher Research Octane Number (RON), Motor Octane Number (MON) and vapour pressure compared to not adding a combination of iso-octane and iso-pentane.

20 Claims, No Drawings

US 10,894,927 B2

ALKYLATE GASOLINE COMPOSITION WITH RENEWABLE NAPHTHA AND ISO-OCTANE

TECHNICAL FIELD

The present invention relates to the field of small engine gasoline such as alkylate gasoline, in particular processes for preparing gasoline compositions and gasoline compositions for small utility engines, as well as uses of such gasoline compositions in a spark ignition engine, and uses of a renewable naphtha distillate as a renewable component in a small engine gasoline.

BACKGROUND ART

Small utility engines are used in various portable gasoline powered tools, such as chainsaws and lawnmowers. These engines run on gasoline (otherwise also known as petrol outside the United States), such as normal unleaded 95 octane (RON) gasoline that can typically be obtained from a gas station. These small utility engines are typically 2- or 4-stroke spark ignition engines. Due to the fact that these small utility engines are usually being used in portable gasoline powered tools, it is not feasible to manufacture these engines to be as emission efficient as e.g. car-engines both from an economical viewpoint, but also from a weight and complexity viewpoint. As a consequence thereof, portable gasoline powered tools running on normal unleaded 95 octane (RON) gasoline typically emit significantly more hydrocarbons compared to a modern (e.g. a 2006 model or newer) car engine. Emission of hydrocarbons, in particular harmful hydrocarbons such as aromatics (which are present in large amounts in normal unleaded 95 octane (RON) gasoline), are damaging to the environment as well as to the health of people exposed to such emissions. This is especially the case for professional gardeners that are exposed to emissions from e.g. lawn mowers on a daily basis or timber loggers who cut trees daily using chain saws.

Such unacceptable emissions also increases the requirement for ventilation when operating small utility engines indoors, e.g. for indoor motocross, which typically requires extensive ventilation, if it is not banned due to a too high emission from such small utility engines as the motocross engine.

Small engine gasoline has been developed to have a mild odour and low emission levels compared to normal unleaded 95 octane (RON) gasoline from the gas station, in that small engine gasoline primarily comprises paraffins and contains no or very little aromatic compounds, such as benzene, as well as very little, but usually no oxygenates such as ethanol. It also contains little or no naphthenes and olefins. Seeing that small engine gasoline is mainly comprised of paraffins, it has a mild odour, and burns more cleanly, producing less particular emissions and fewer deposits. Furthermore the lack of oxygenates, in particular the lack of ethanol helps keep the small utility engine running cleaner for a longer time. Finally, ethanol absorbs moisture, and if the portable gasoline powered tool is stored for lengthy periods, such as a lawnmower during winter, the ethanol absorbs moisture and may cause corrosion. If the water ethanol mixture separates from the hydrocarbons, octane numbers may become unacceptable.

The addition of bio-ethanol to regular unleaded 95 octane (RON) gasoline increases the renewable content of the gasoline, and thereby the "green" profile of a fossil gasoline product.

Small engine gasoline keeps the emissions low and improves the storage stability thereby providing an improved fuel for small utility engines compared to normal unleaded 95 octane (RON) gasoline. However, small engine gasoline is obtained from fossil origin, as this is currently the economically most feasible.

Both aromatic compounds and oxygenates have high octane numbers compared to corresponding saturated paraffins of the same carbon chain lengths. The lack of these compounds in alkylate presents challenges in achieving specifications such as octane number without additives such as lead, used to increase the octane number (RON).

SUMMARY OF THE INVENTION

The present invention was made in view of the prior art described above, and the object of the present invention is to provide small engine gasoline fulfilling specifications to be used as a small engine gasoline with a more "green" content, and without containing oxygenates, such as ethanol and MTBE, which are challenging components regarding engine operability, emissions and storage. In particular there is a desire to at least provide processes or alternative processes for preparing small engine gasoline and compositions of small engine gasoline fulfilling specifications to be used as a small engine gasoline with a more "green" content.

To solve the problem, the present invention provides a process for preparing a gasoline composition, which comprises (a) admixing with an alkylate base gasoline, such as a fossil alkylate base gasoline, comprising: 90 vol-% or more $C_5$-$C_{12}$ paraffins, 5 vol-% or less of naphthenes, 1 vol-% or less of aromatics, 1 vol-% or less of oxygenates, RON of at least 87, the alkylate base fuel in an amount in the range from 40 to 90 vol % based on the total gasoline composition; (b) a renewable naphtha distillate comprising: 90 vol-% or more $C_5$-$C_{12}$ paraffins, 30 vol-% or more $C_5$-$C_6$ paraffins, 5 vol-% or less of naphthenes, 1 vol-% or less of aromatics, 1 vol-% or less of oxygenates, the renewable naphtha distillate in an amount of 1 vol-% or more, such as 3 vol-% or more, such as 5 vol-% or more, e.g. in the range from 3 to 10 vol % based on the total gasoline composition; and (c) one or more $C_6$-$C_{12}$ iso-paraffins having a RON of at least 95, the one or more iso-paraffins in an amount in the range from 10 to 30 vol % based on the total gasoline composition.

That is, the inventors of the present invention in a first aspect of the invention found that a renewable naphtha distillate having a low octane number of around 35-50 (RON) can be mixed with a fossil alkylate base gasoline and still maintain the octane number (RON) provided that iso-octane and/or one or more iso-paraffins having an octane number (RON) of at least 95 is admixed.

The one or more iso-paraffins having an octane number (RON) of at least 95, may be selected from $C_6$-$C_{12}$ iso-paraffins, such as from the list consisting of: 2,3-dimethylbutane, iso-octane, 2,2,4-trimethylpentane, 2,3,3-trimethylpentane, 2,2,3-trimethylpentane, 2,2,3-trimethylbutane. For example the one or more $C_6$-$C_{12}$ iso-paraffins may be iso-octane.

The process may also further involve adding (d) one or more $C_4$-$C_5$ paraffins in an amount of 10 vol-% or more, such as between 10-35 vol-%, where the $C_4$-$C_5$ paraffins are selected from the list consisting of: iso-pentane, iso-butane, n-butane, neo-pentane. For example the one or more $C_4$-$C_5$ paraffins may be iso-pentane.

The inventors of the present invention have found that a renewable naphtha distillate typically having a low octane number of around 35-50 (RON) and a low vapour pressure of between 15-25 kPa can be mixed with a fossil alkylate base gasoline and still maintain important parameters such as the research octane number (RON) and motor octane number (MON) as well as the vapour pressure by admixing iso-octane and/or one or more iso-paraffins having an octane number (RON) of at least 95 together with iso-pentane and/or one or more $C_4$-$C_5$ paraffins. Surprisingly it was found that the effect of adding iso-octane having a high octane number (RON=100) and low vapour pressure (5.5 kPa @ 20° C.) together with iso-pentane having a lower octane number (RON=92) and a higher vapour pressure (77 kPa @ 20° C.) did not cancel out the effects on RON, MON and vapour pressure, but rather allowed a higher mixing ratio of the renewable naphtha and/or a higher RON, MON and vapour pressure compared to not adding a combination of iso-octane and iso-pentane (compare example 1, experiment 3 without iso-octane and iso-pentane with experiment 7 with both iso-octane and iso-pentane added. The relevant parameters: RON, MON and vapour pressure are higher compared to no addition, which means that a higher mixing ratio of the renewable naphtha can be used).

The renewable naphtha distillate may comprise an iso-paraffin/n-paraffin ratio of more than 1, such as more than 1.2.

The renewable naphtha distillate may have a RON from 35 to 70, such as from 35 to 60 or from 35 to 50.

In another aspect of the present invention, a gasoline composition obtainable according to the process is provided.

In another aspect of the present invention, a gasoline composition for a small utility engine is provided. It comprises (a) a fossil alkylate base gasoline in an amount in the range from 40 to 90 vol % based on the total gasoline composition comprising:

90 vol-% or more $C_5$-$C_{12}$ paraffins; (b) a renewable naphtha distillate in an amount in the range from 1 to 10 vol % based on the total gasoline composition comprising: 90 vol-% or more $C_5$-$C_{12}$ paraffins, 30 vol-% or more $C_5$-$C_6$ paraffins; and (c) one or more $C_6$-$C_{12}$ iso-paraffins in an amount in the range from 10 to 30 vol % based on the total gasoline composition, having a RON of at least 95; wherein the gasoline composition comprises: 90 vol-% or more $C_5$-$C_{12}$ paraffins, 1 vol-% or less of naphthenes, 1 vol-% or less of aromatics, 1 vol-% or less of oxygenates, RON of at least 92, such as at least 93.

The one or more $C_6$-$C_{12}$ iso-paraffins may be selected from the list consisting of: 2,3-dimethylbutane, iso-octane, 2,2,4-trimethylpentane, 2,3,3-trimethylpentane, 2,2,3-trimethylpentane, 2,2,3-trimethylbutane, and the one or more $C_6$-$C_{12}$ iso-paraffins may be iso-octane.

The gasoline composition may further comprise: (d) one or more $C_4$-$C_5$ paraffins in an amount of 10-35 vol-%, where the $C_4$-$C_5$ paraffins are selected from the list consisting of: iso-pentane, iso-butane, n-butane, neo-pentane. The one or more $C_4$-$C_5$ iso-paraffins may be iso-pentane.

In another aspect of the present invention, the use of the gasoline composition obtainable according to the processes of the invention or the gasoline composition according to the invention in a spark ignition engine is provided.

The spark ignition engine may be a 2-stroke engine or a 4-stroke engine. The spark ignition engine may be part of a portable gasoline powered tool. The spark ignition engine may be selected from the list consisting of engines for a: garden tool, forestry tool, chain saw, clearing saw, outboard motor, lawn mower, lawn tractor, string trimmer, snowblower, snowmobile, backpack blower or sucker, water ski, jet ski, motocross, concrete mixers, generators, or the like.

In another aspect of the present invention, the use of a renewable naphtha distillate as a renewable component in a small engine gasoline comprising a major portion of a small engine gasoline, which may be of fossil origin, and a minor portion of a renewable naphtha distillate, and where the renewable naphtha distillate comprises: 90 vol-% or more $C_5$-$C_{12}$ paraffins, 30 vol-% or more $C_5$-$C_6$ paraffins, 5 vol-% or less of naphthenes, 1 vol-% or less of aromatics, 1 vol-% or less of oxygenates.

The renewable naphtha distillate may have a boiling point range of 30-200° C., such as 90-200° C., or 40-180° C.

The portion of the renewable naphtha distillate may be in an amount of 1 vol-% or more, 3 vol-% or more, preferably 5 vol-% or more based on the total gasoline composition.

DETAILED DESCRIPTION OF THE INVENTION

In describing the embodiments of the invention specific terminology will be resorted to for the sake of clarity. However, the invention is not intended to be limited to the specific terms so selected, and it is understood that each specific term includes all technical equivalents which operate in a similar manner to accomplish a similar purpose.

One of the objects of the present invention is to provide small engine gasoline fulfilling specifications to be used as a small engine gasoline with a more "green" content, and without containing oxygenates, such as ethanol and MTBE, which are challenging components regarding engine operability, emissions and storage.

Accordingly, the present invention provides a process for preparing a gasoline composition, in particular an alkylate gasoline composition, which comprises (a) admixing with an alkylate base gasoline, (b) a renewable naphtha distillate and (c) one or more $C_6$-$C_{12}$ iso-paraffins having a RON of at least 95.

It was found that a renewable naphtha distillate typically having a low octane number of around 35-50 (RON) can be mixed with a fossil alkylate base gasoline and still maintain the octane number (RON) provided that iso-octane and/or one or more iso-paraffins having an octane number (RON) of at least 95 is admixed.

Alkylate base gasoline is paraffinic with very little naphthenes, aromatics and oxygenates. It may be derived from the refining of crude oil, where it is typically blended from several petroleum refinery process streams, such as direct distillation of crude oil, catalytic and thermal cracking, hydrocracking, catalytic reforming, alkylation and polymerisation. As a result thereof alkylate base gasoline comprise many different compounds, such as more than 40 or 50 different compounds. For example it may comprise between 40 and 100 different compounds, such as between 40 and 80 different compounds. It may have an initial boiling point (IBP) of about 30° C. or about 35° C. and a final boiling point (FBP) of about 200° C. or about 205° C. For example the gasoline compositions may have an initial boiling point (IBP) within about 30° C. or within about 35° C. and a final boiling point (FBP) of within about 200° C. or within about 205° C., for example within 30-205° C. The hydrocarbons present in that distillation range usually range from those containing 4 or 5 carbon atoms to those containing 10 or 11 or 12 carbon atoms.

Alkylate base gasoline is mainly comprised of paraffins (alkanes), which can be straight-chain n-paraffins or the branched iso-paraffins. Alkylate base gasoline may have 90 vol-% or more $C_5$-$C_{12}$ paraffins, such as 95 vol-% or more $C_5$-$C_{12}$ paraffins, or 98 vol-% or more $C_5$-$C_{12}$ paraffins.

The alkylate base fuel may be a fossil alkylate base gasoline or the major part of the alkylate base fuel may be of fossil origin.

In addition to mainly comprising paraffins, the alkylate base gasoline also has a very low content of naphthenes (cycloalkanes), which are alkanes with at least one non-aromatic ring structure, where the ring typically has 5 or 6 carbon atoms. Alkylate base gasoline may have 5 vol-% or less of naphthenes, such as 1 vol-% or less of naphthenes or 0.5 vol-% or less of naphthenes.

In addition to mainly comprising paraffins, the alkylate base gasoline also has a very low content of aromatics. Aromatic compounds contain a benzene ring or other ring structure that is aromatic. Alkylate base gasoline may have 1 vol-% or less of aromatics, such as 0.5 vol-% or less of aromatics, or 0.1 vol-% or less of aromatics.

In addition to mainly comprising paraffins, the alkylate base gasoline also has a very low content of oxygenates. Oxygenates are organic molecules that contain oxygen as part of their chemical structure, and are usually employed as gasoline additives to reduce carbon oxides and soot created during the burning of the fuel. Commonly oxygenates comprise alcohols, ethers and esters. Alkylate base gasoline may have 1 vol-% or less of oxygenates such as 0.5 vol-% or less of oxygenates, or 0.1 vol-% or less of oxygenates. Usually alkylate base gasolines have no oxygenates at all.

Most small engines are designed to run on 87-92 octane rated fuels ((RON+MON)/2), although premium octane alkylate gasolines may have a higher octane rating.

The alkylate base gasoline may have a Research Octane Number (RON) of at least 87, such as at least 90. Premium octane alkylate gasolines may have a higher octane number (RON) of 92 or more, such as above 92 are desirable, for example 93 or more, such as above 93 (RON). The higher octane number can help when engines are running hotter than they should, as elevated engine temperatures require higher octane gasoline to prevent pre-ignition, which is to be avoided in small engines. The higher octane number is also desirable when using the alkylate gasoline for more demanding tasks, such as in outboard motors, snow mobiles, water skis, jet skis, motocross, and the like.

The alkylate gasoline is in some countries limited to a maximum 98 octane (RON) by law, such as a maximum of 95 octane (RON).

Octane numbers measured are not an absolute number, but rather it is relative to a mixture of n-heptane having an octane number (RON and MON) of 0 by definition and 2,2,4-trimethyl pentane having an octane number (RON and MON) of 100 by definition. The RON number correlates with full-scale spark-ignited engine antiknock performance at low speed. The motor method octane number (MON) correlates with full-scale spark-ignited engine antiknock performance at high speed. Research Octane Numbers (RON) and Motor Octane Numbers (MON) are both measured in a test engine, but the MON is measured under conditions designed to further stress the gasoline's antiknock resistance, of which the octane number is a measure of. Accordingly, it often seen that the MON is lower than the RON, although there is no direct link between RON and MON. It is usually required to both specify a minimum RON and a minimum MON.

In some cases the alkylate base gasoline may have a Motor Octane Number (MON) of at least 80 or 85. Premium octane alkylate gasolines may have a higher octane number (MON) of 90 or more, such as above 90.

Vapour pressure of the gasoline is also a matter of importance relating to in particular engines with a carburetor, which is often present in small engines. While vapour pressure is often manipulated seasonally (higher vapour pressure for winter gasoline, and lower vapour pressure for summer gasoline), there is nevertheless a minimum vapour pressure for gasoline. The high vapour pressure of gasoline helps ensuring that the gasoline is in gaseous form in the combustion chamber of the engine.

The alkylate base gasoline may have a vapour pressure of 50 kPa or more, such as at least 55 kPa or more and as high as 95 kPa. The gasoline according to the invention may have a vapour pressure of 50 kPa or more, such as at least 55 kPa or more and as high as 95 kPa.

The alkylate base fuel may be present as the major amount of the total gasoline composition to be prepared according to the present invention. In particular, it may be in an amount of 40 vol-% or more, such as 45 vol-% or more, or 50 vol-% or more of the total gasoline composition. The alkylate base gasoline may equally also be present in a maximum amount of 90 vol-% or less, such as 80 vol-% or less, or 70 vol-% or less, or 60 vol-% or less. For example the alkylate base gasoline may be present in an amount of 40 to 90 vol % based on the total gasoline composition, such as in an amount of 45 to 70 vol % based on the total gasoline composition.

As shown in example 1, experiment 1 there is an alkylate gasoline obtained from an alkylation unit and which is then further distilled, and where additional components can be introduced into alkylate gasoline to obtain the specifications given in example 1, experiment 1 for the alkylate base gasoline. The alkylate base gasoline has 90 vol-% or more $C_5$-$C_{12}$ paraffins (not shown), an aromatics content of 1 vol-% or less, olefin content of 1 vol-% or less, a naphthenes content of 5 vol-% or less (not shown), an oxygenates content of 1 vol-% or less (not shown) and having a vapour pressure above 50 kPa, a RON of at least 92 and a MON at least 90.

As mentioned above, the process for preparing a gasoline composition according to the present invention comprises (a) admixing with an alkylate base gasoline, (b) a renewable naphtha distillate and (c) one or more $C_6$-$C_{12}$ iso-paraffins having a RON of at least 95.

A renewable naphtha distillate may be produced as part of the refining of renewable diesel. Renewable diesel may be obtained from the processing of fatty acid containing materials, such as animal fats, algae, and plant material. Plant material may comprise both vegetable based material, such as vegetable oils as well as oils obtained from other plants, such as oils from trees, e.g. tall oil. Renewable diesel and renewable naphtha distillate may be obtained from the hydrotreatment of fatty acids, and derivatives thereof, such as triglycerides. The hydrotreatment of fatty acids and derivatives thereof involves deoxygenation reactions, such as hydrodeoxygenation (HDO), and may also involve other hydroprocessing reactions, such as isomerisation (for example hydroisomerisation) and cracking (for example hydrocracking). When refining the renewable diesel a renewable naphtha distillate is obtained. It may have an initial boiling point (IBP) of about 30° C. or about 35° C. and a final boiling point (FBP) of about 200° C. or about 205° C. For example the gasoline compositions may have an initial boiling point (IBP) within about 30° C. or within about 35° C. and a final boiling point (FBP) of within about 200° C. or within about 205° C., for example within 30-205° C. The hydrocarbons present in that distillation range usually range from those containing 4 or 5 carbon atoms to those containing about 10 or 11 or 12 carbon atoms.

Renewable fuels, such as renewable naphtha distillate, are collected from resources, which are naturally replenished on a human timescale, as opposed to fossil fuels, such as petroleum gasoline, which are derived from the refining of crude oil. A renewable naphtha distillate may be obtained from the hydrotreatment of fatty acids, and derivatives thereof present in fatty acid containing materials such as animal fats and plant material, the hydrotreatment comprising hydrodeoxygenation and hydroisomerisation, and comprise the fraction with an IBP of 30° C., such as an IBP of 30° C. or higher and a FBP of 200° C., such as a FBP of 200° C. or lower. The renewable content may also be determined by isotopic distribution involving $^{14}C$, $^{13}C$ and/or $^{12}C$ as described in ASTM D6866.

Because the paraffins of the renewable naphtha is obtained from the processing of fatty acid containing materials, such as animal fats and plant material, the renewable naphtha distillate is paraffinic with very little naphthenes and virtually no aromatics or oxygenates.

Renewable naphtha distillate is mainly comprised of paraffins (alkanes), which can be straight-chain n-paraffins or the branched iso-paraffins. Renewable naphtha may have 90 vol-% or more $C_5$-$C_{12}$ paraffins, such as 95 vol-% or more $C_5$-$C_{12}$ paraffins, or 98 vol-% or more $C_5$-$C_{12}$ paraffins.

When the renewable naphtha distillate has been produced as described above as part of the refining of renewable diesel, it may comprise 30 vol-% or more $C_5$-$C_6$ paraffins, such as 40 vol-% or more.

In addition to mainly comprising paraffins, the renewable naphtha distillate also has a low content of naphthenes (cycloalkanes), which are alkanes with at least one non-aromatic ring structure, where the ring typically has 5 or 6 carbon atoms. Renewable naphtha distillate may have 5 vol-% or less of naphthenes, such as 1 vol-% or less of naphthenes or 0.5 vol-% or less of naphthenes.

In addition to mainly comprising paraffins, the renewable naphtha distillate also has a very low content of aromatics. Aromatic compounds contain a benzene ring or other ring structure that is aromatic. Renewable naphtha distillate may have 1 vol-% or less of aromatics, such as 0.5 vol-% or less of aromatics, or 0.1 vol-% or less of aromatics.

In addition to mainly comprising paraffins, the renewable naphtha distillate also has a very low content of oxygenates. Oxygenates are organic molecules that contain oxygen as part of their chemical structure, and are usually employed as gasoline additives to reduce carbon oxides and soot created during the burning of the fuel. Commonly oxygenates comprise alcohols, ethers and esters. Renewable naphtha distillate may have 1 vol-% or less of oxygenates such as 0.5 vol-% or less of oxygenates, or 0.1 vol-% or less of oxygenates, although it is preferably essentially free of oxygenates.

As shown in example 1, experiment 5 there is an example of a renewable naphtha distillate. Renewable naphtha distillate may be produced as part of the refining of renewable diesel. Such products are commercially available under the tradename Neste renewable naphtha, also known as Nex-Naphtha, and is produced by Neste Oyj, Finland.

The below table 1 shows an example of the normalised volume percentages of different hydrocarbons in the renewable naphtha distillate used in example 1.

TABLE 1 example of a renewable naphtha distillate

| Carbon number | Naphthenes | iso-paraffins | n-paraffins | Total |
|---|---|---|---|---|
| 4 | — | — | — | — |
| 5 | 0.1 | 6 | 10 | 16.1 |
| 6 | 0.4 | 13 | 13 | 26.4 |
| 7 | 0.8 | 18 | 10 | 28.8 |
| 8 | — | 14 | 5 | 19 |
| 9 | 0.1 | 5 | — | 5.1 |
| 10 | 1.1 | — | — | 1.1 |
| 11 | 1.0 | 0.8 | 1 | 2.8 |
| 12+ | — | 0.7 | — | 0.7 |
| Total | 3.5 | 57.5 | 39 | 100 |

The renewable naphtha distillate may have a RON and/or a MON from 35 to 70, such as from 35 to 60 or from 35 to 50. Some of the renewable naphtha distillates have a RON and/or MON of around 35 to 45, which are too low octane numbers to be useful in small utility engines, which typically requires 87 or higher octane rating ((RON+MON)/2).

As mentioned above, vapour pressure of the gasoline is also a matter of importance in small utility engines. The renewable naphtha distillate may have a vapour pressure below 30 kPa, such as below 25 kPa, such as below 20 kPa. The vapour pressure of the renewable naphtha may equally also be 10 kPa or higher, such as 15 kPa or higher. Such a vapour pressure is too low to be useful in small utility engine, which require a gasoline with a higher vapour pressure, such as 50 kPa or higher, for example 55 kPa or higher.

The renewable naphtha distillate may be added to mixture in at least 1 vol-% or more based on the total gasoline composition, such as at least 3 vol-% or more or as at least 5 vol-% or more. It is preferred to be able to add as much renewable naphtha distillate as possible in order to increase the "green"/renewable part of the gasoline composition according to the present invention. In some cases a maximum of 20 vol-% based on the total gasoline composition is added, for example a maximum of 15 vol-%, such as a maximum of 10 vol-%. For example the one or more iso-paraffins may be mixed in an amount in the range from 10 to 30 vol % based on the total gasoline composition.

As mentioned above, the process for preparing a gasoline composition according to the present invention, which comprises (a) admixing with an alkylate base gasoline, (b) a renewable naphtha distillate and (c) one or more $C_6$-$C_{12}$ iso-paraffins having a RON of at least 95.

One or more $C_6$-$C_{12}$ iso-paraffins having a RON of at least 95 is admixed in an amount in the range from 10 to 30 vol % based on the total gasoline composition. It was found that a renewable naphtha distillate typically having a low octane number of around 35-50 (RON) can be mixed with a fossil alkylate base gasoline and still maintain the octane number (RON) provided that iso-octane and/or one or more iso-paraffins having an octane number (RON) of at least 95 is admixed.

The one or more iso-paraffins having an octane number (RON) of at least 95, may be selected from $C_6$-$C_{12}$ iso-paraffins, such as from the list consisting of: 2,3-dimethylbutane, iso-octane, 2,2,4-trimethylpentane, 2,3,3-trimethylpentane, 2,2,3-trimethylpentane, 2,2,3-trimethylbutane. These iso-paraffins have a RON of at least 95. The one or more iso-paraffins having an octane number (RON) of at least 95 may be 2,2,4-trimethylpentane. The one or more iso-paraffins having an octane number (RON) of at least 95 may also be iso-octane, which is used to denote one or more of the following three isomers of octane: 2,2,4-trimethylpentane, 2,3,3-trimethylpentane, 2,2,3-trimethylpentane, e.g. 2,2,4-trimethylpentane. Iso-octane may be of fossil origin or of renewable origin. It may be prepared synthetically by a number of routes, such as dimerization of iso-butane or iso-butene, e.g. iso-butane and iso-butene obtained from a renewable source.

The inventors of the present invention have found that a renewable naphtha distillate typically having a low octane number of around 35-50 (RON) and a low vapour pressure of between 15-25 kPa can be mixed with a fossil alkylate base gasoline and still maintain important parameters such as the research octane number (RON) and motor octane number (MON) as well as the vapour pressure by admixing iso-octane and/or one or more iso-paraffins having an octane number (RON) of at least 95 together with iso-pentane and/or one or more $C_4$-$C_5$ paraffins. Surprisingly it was found that the effect of adding iso-octane having a high octane number (RON=100) and very low vapour pressure (5.5 kPa @ 20° C.) together with iso-pentane having a lower octane number (RON=92) and a higher vapour pressure (77 kPa @ 20° C.) did not cancel out the effects on RON, MON and vapour pressure, but rather allowed a higher mixing ratio of the renewable naphtha and/or a higher RON, MON and vapour pressure compared to not adding a combination of iso-octane and iso-pentane (compare example 1, experiment 3 without iso-octane and iso-pentane with experiment 7 with both iso-octane and iso-pentane added. The relevant parameters: RON, MON and vapour pressure are higher compared to no addition, which means that a higher mixing ratio of the renewable naphtha can be used).

Accordingly, the process of the present invention may also involve further adding (d) one or more $C_4$-$C_5$ paraffins in an amount of 10 vol-% or more, such as between 10-35 vol-%, where the $C_4$-$C_5$ paraffins are selected from the list consisting of: iso-pentane, iso-butane, n-butane, neo-pentane. For example the one or more $C_4$-$C_5$ paraffins may be iso-pentane. Iso-octane may be of fossil origin or of renewable origin.

When both the iso-octane and/or iso-pentane are of renewable origin, the share of "green"/renewable content in the gasoline composition is increased.

As mentioned above the renewable naphtha distillate may be produced as part of the refining of renewable diesel, and as such has undergone hydrotreatment comprising hydrodeoxygenation and hydroisomerisation. When the renewable naphtha distillate has undergone isomerisation reactions, such as hydroisomerisation, the renewable naphtha distillate may comprise an iso-paraffin/n-paraffin ratio of more than 1, such as more than 1.2. For example the ratio may be between 1 and 2.

The content of the renewable naphtha distillate may advantageously be isomerised beyond its initial isomerisation ratio to yield an iso-paraffin/n-paraffin ratio of above 2, such as 5, 8, 10, 15, 20, 30 or above. The isomerisation isomerises both the n-pentane and the n-hexane content of the naphtha distillate, and as such it prepares iso-pentane, and removes n-hexane as iso-hexane. Further isomerising the renewable naphtha distillate does not result in a loss of product, as would be the case with a more narrow distillation or with cracking, or if n-paraffins had been removed using molecular sieves. Further, it works in synergy with the addition of iso-octane and/or iso-pentane, as the isomerisation of the naphtha distillate creates a higher content of iso-octane and iso-pentane from the renewable naphtha distillate, allowing for an even larger mixing ratio of the renewable naphtha distillate.

As described above, the process for preparing a gasoline composition according to the present invention, which comprises (a) admixing with an alkylate base gasoline, (b) a renewable naphtha distillate and (c) one or more $C_6$-$C_{12}$ iso-paraffins having a RON of at least 95, and optionally (d) one or more $C_4$-$C_5$ paraffins.

Accordingly, in another aspect of the present invention, a gasoline composition obtainable according to the process is provided, as well as a gasoline composition for a small utility engine comprising is provided.

The gasoline composition comprising (a) a fossil alkylate base gasoline in an amount in the range from 40 to 90 vol % based on the total gasoline composition comprising: 90 vol-% or more $C_5$-$C_{12}$ paraffins; (b) a renewable naphtha distillate in an amount in the range from 1 to 10 vol % based on the total gasoline composition comprising: 90 vol-% or more $C_5$-$C_{12}$ paraffins, 30 vol-% or more $C_5$-$C_6$ paraffins; and (c) one or more $C_6$-$C_{12}$ iso-paraffins in an amount in the range from 10 to 30 vol % based on the total gasoline composition, having a RON of at least 95; wherein the gasoline composition comprises: 90 vol-% or more $C_5$-$C_{12}$ paraffins, 1 vol-% or less of naphthenes, 1 vol-% or less of aromatics, 1 vol-% or less of oxygenates, RON of at least 92, such as at least 93.

The one or more $C_6$-$C_{12}$ iso-paraffins may be selected from the list consisting of: 2,3-dimethylbutane, iso-octane, 2,2,4-trimethylpentane, 2,3,3-trimethylpentane, 2,2,3-trimethylpentane, 2,2,3-trimethylbutane, and the one or more $C_6$-$C_{12}$ iso-paraffins may be iso-octane.

The gasoline composition may further comprise: (d) one or more $C_4$-$C_5$ paraffins in an amount of 10-35 vol-%, where the $C_4$-$C_5$ paraffins are selected from the list consisting of: iso-pentane, iso-butane, n-butane, neo-pentane. The one or more $C_4$-$C_5$ iso-paraffins may be iso-pentane.

In another aspect of the present invention, the use of the gasoline composition obtainable according to the processes of the invention or the gasoline composition according to the invention in a spark ignition engine is provided.

The spark ignition engine may be a 2-stroke engine or a 4-stroke engine. The spark ignition engine may be part of a portable gasoline powered tool. The spark ignition engine may be selected from the list consisting of engines for a: garden tool, forestry tool, chain saw, clearing saw, outboard motor, lawn mower, lawn tractor, string trimmer, snow blower, snowmobile, backpack blower or sucker, water ski, jet ski, motocross, concrete mixers, or generators. For example the spark ignition engine may have a cylinder displacement of 500 cm$^3$ or less, such as 100 cm$^3$ or less. Chainsaws and other garden or forestry tools may have a cylinder displacement of 100 cm$^3$ or less.

The gasoline compositions described herein or obtainable according to the present invention is suitable for small utility engines, in particular to the mentioned items containing a spark ignition engine, as these items are in many cases seasonal items used predominantly during winter or summer, or used infrequently, such as a generator. This is in part because of the absence or very low content of oxygenates in the gasoline compositions. Oxygenates such as ethanol are often added to regular unleaded 95 octane (RON) gasoline to improve the octane number, and bio-ethanol added to such gasoline also increases the renewable content of gasoline, and thereby the "green" profile of a fossil gasoline product. However, ethanol absorbs moisture over time which may cause corrosion and start trouble after lengthy storage of such items. The gasoline compositions may have an initial boiling point (IBP) of about 30° C. or about 35° C. and a final boiling point (FBP) of about 200° C. or about 205° C., for example from 30-205° C. For example the gasoline compositions may have an initial boiling point (IBP) within about 30° C. or within about 35° C. and a final boiling point (FBP) of within about 200° C. or within about 205° C., for example within 30-205° C.

EXAMPLES

A number of mixtures of an alkylate base gasoline (a light alkylate distillate of fossil origin obtained from Neste Oyj, Naantali) with one or more of a renewable naphtha distillate (having a composition as shown in table 1 above), iso-pentane, and iso-octane (2,2,4-trimethylpentane) has been prepared as shown in the below table 2.

TABLE 2

Alkylate gasolines

| | | Experiment | | | | | | | | |
|---|---|---|---|---|---|---|---|---|---|---|
| | | 1 | 2 | 3 | 4 | 5 | 6 | 7 | 8 | 9 |
| Alkylate base gasoline | vol-% | 100% | 99% | 97% | 95% | 0% | 69% | 47% | 59% | 57% |
| iso-Pentane | vol-% | 0% | 0% | 0% | 0% | 0% | 31% | 30% | 31% | 30% |
| iso-Octane | vol-% | 0% | 0% | 0% | 0% | 0% | 0% | 20% | 10% | 10% |
| Renewable naphtha distillate | vol-% | 0% | 1% | 3% | 5% | 100% | 0% | 3% | 0% | 3% |
| Density | kg/m$^3$ | 686.4 | 686.8 | 686.7 | 686.6 | 681.5 | 686.8 | 683.4 | 685.1 | 685 |
| Vapour Pressure | kPa | 56.6 | 56.1 | 55.9 | 55.4 | 18.5 | 59.4 | 58.4 | 59.2 | 58.7 |
| DIS-E70 | vol-% | 27 | 26.4 | 26.7 | 26.3 | 17.9 | 28.2 | 28.4 | 28.5 | 28 |
| DIS-E100 | vol-% | 45.7 | 45.9 | 46.3 | 46.5 | | 46.3 | 50.8 | 48 | 48.6 |
| RONc | | 94.2 | 93.6 | 92.8 | 91.7 | 40.3 | 93.7 | 93.4 | 94.3 | 92.8 |
| MONc | | 91.8 | 91.4 | 90.5 | 89.8 | 43.5 | 91.6 | 91.5 | 91.8 | 91.0 |
| Aromatics | vol-% | 0.5 | 0.53 | 0.52 | 0.51 | 0.1 | 0.5 | 0.4 | 0.5 | 0.4 |
| Olefins | vol-% | 0.1 | 0.32 | 0.32 | 0.32 | <0.1 | 0.2 | 0.2 | 0.2 | 0.2 |
| n-Hexane | vol-% | | 0.15 | 0.41 | 0.68 | 13.41 | 0.1 | 0.4 | 0.1 | 0.4 |
| Benzene | vol-% | 0.07 | 0.08 | 0.08 | 0.07 | 0.01 | 0.1 | 0.11 | 0.1 | 0.1 |
| Cycloalkanes | vol-% | | <0.1 | <0.1 | <0.1 | | | | | |
| Paraffins | vol-% | | | | | | 96.7 | 97.1 | 97.1 | 96.7 |
| Renewable content | | 0 | 1 | 3 | 5 | 0 | 0 | 23 | 10 | 13 |

In another aspect of the present invention, the use of a renewable naphtha distillate as a renewable component in a small engine gasoline comprising a major portion of a small engine gasoline, which may be of fossil origin, and a minor portion of a renewable naphtha distillate, and where the renewable naphtha distillate comprises: 90 vol-% or more $C_5$-$C_{12}$ paraffins, 30 vol-% or more $C_5$-$C_6$ paraffins, 5 vol-% or less of naphthenes, 1 vol-% or less of aromatics, 1 vol-% or less of oxygenates.

The renewable naphtha distillate may have a boiling point range of 30-200° C., such as 90-200° C., or 40-180° C. The boiling point range being expressed as initial boiling point (IBP) and final boiling point (FBP). That is that the boiling point range may be within 30-200° C., such as within 90-200° C. or 40-180° C.

The portion of the renewable naphtha distillate may be in an amount of 1 vol-% or more, 3 vol-% or more, preferably 5 vol-% or more based on the total gasoline composition.

When describing the embodiments of the present invention, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

The terms "comprising", "comprise" and comprises herein are intended by the inventors to be optionally substitutable with the terms "consisting of", "consist of" and "consists of", respectively, in every instance.

The density was measured according to ENISO12185, vapour pressure according to EN13016-1, DIS-E70 and DIS-E100 according to ENISO3405, the RONc according to ENISO5164, the MONc according to ENISO5163, and aromatics, olefins, n-hexane, benzene, cycloalkanes and paraffins according to ENISO22854.

It was found that the addition of a mixture of iso-pentane, iso-octane and alkylate base fuel will allow the blending of 5% or more of renewable naphtha distillate while maintaining the fuel as a pure alkylate fuel and at the same time fulfilling specifications for vapour pressure RON and MON.

The invention claimed is:

1. Process for preparing a gasoline composition, which process comprises:
   (a) admixing with a fossil alkylate base fuel containing:
   90 vol-% or more $C_5$-$C_{12}$ paraffins,
   5 vol-% or less of naphthenes,
   1 vol-% or less of aromatics,
   1 vol-% or less of oxygenates, and
   RON of at least 87,
   the alkylate base fuel being in an amount in a range from 40 to 80 vol % based on the total gasoline composition;
   (b) a renewable naphtha distillate containing:
   90 vol-% or more $C_5$-$C_{12}$ paraffins, of which 30 vol-% or more are $C_5$-$C_6$ paraffins,
   5 vol-% or less of naphthenes,
   1 vol-% or less of aromatics, and
   1 vol-% or less of oxygenates,
   the renewable naphtha distillate being in an amount of 3 vol-% or more based on the total gasoline composition; and (c) one or more $C_6$-$C_{12}$ iso-paraffins having a RON of at least 95, the one or more iso-paraffins being in an amount in range from 10 to 30 vol % based on the total gasoline composition, and wherein the renewable content is determined by isotopic distribution involving 14C, 13 and/or 12C as described in ASTM D6866.

2. Process according to claims 1 comprising:
selecting the one or more $C_6$-$C_{12}$ iso-paraffins from a group consisting of: 2,3 dimethylbutane, iso-octane, 2,2,4-trimethylpentane, 2,3,3-trimethylpentane, 2,2,3-trimethylpentane, and 2,2,3-trimethylbutane.

3. Process according to claim 1, wherein the one or more $C_6$-$C_{12}$ iso-paraffins is iso-octane.

4. Process according to claim 1, further comprising:
(d) admixing one or more $C_4$-$C_5$ paraffins in an amount of 10-35 vol-%, where the $C_4$-$C_5$ paraffins are selected from the group consisting of: iso-pentane, iso-butane, n-butane, and neo-pentane.

5. Process according to claim 4, wherein the one or more $C_4$-$C_5$ paraffins is iso-pentane.

6. Process according to claim 1, comprising:
selecting the renewable naphtha distillate to have an iso-paraffin/n-paraffin ratio to be at least one of more than 1, or more than 1.2.

7. Process according to claim 1, comprising:
selecting the renewable naphtha distillate to have at least one of a RON from 35 to 60, or from 35 to 50.

8. Process according to claim 1, wherein the gasoline composition comprises a fossil alkylate base fuel containing:
90 vol-% or more $C_5$-$C_{12}$ paraffins,
1 vol-% or less of naphthenes,
1 vol-% or less of aromatics,
1 vol-% or less of oxygenates,
RON of at least 92,
and a vapour pressure selected to be at least 50 kPa, and optionally a MON of at least 90, and wherein the vapour pressure is measured at 20° C.

9. Process according to claim 1, wherein the fossil alkylate base includes a vapour pressure of 50 kPa or more and/or the renewable naphtha distillate has a RON from 35 to 60, and wherein the vapour pressure is measured at 20° C.

10. Gasoline composition for a utility engine comprising:
(a) a fossil alkylate base fuel in an amount in a range from 40 to 80 vol % based on the total gasoline composition, the fossil alkylate base fuel containing 90 vol-% or more $C_5$-$C_{12}$ paraffins;
(b) a renewable naphtha distillate in an amount in a range from 3 to 10 vol % based on the total gasoline composition, the renewable naphtha-distillate containing 90 vol-% or more $C_5$-$C_{12}$ paraffins of which 30 vol-% or more are $C_5$-$C_6$ paraffins; and
(c) one or more $C_6$-$C_{12}$ iso-paraffins in an amount in a range from 10 to 30 vol % based on the total gasoline composition, the iso-paraffins having a RON of at least 95;

wherein the fossil alkylate base fuel contains:
90 vol-% or more $C_5$-$C_{12}$ paraffins,
1 vol-% or less of naphthenes,
1 vol-% or less of aromatics,
1 vol-% or less of oxygenates,
RON of at least 93, and
wherein renewable content is determined by isotopic distribution involving 14C, 13C and/or 12C as described in ASTM D6866.

11. Gasoline composition according to claim 10, comprising:
one or more $C_6$-$C_{12}$ iso-paraffins from a group consisting of: 2,3-dimethylbutane, iso-octane, 2,2,4-trimethylpentane, 2,3,3-trimethylpentane, 2,2,3-trimethylpentane, or 2,2,3-trimethylbutane.

12. Gasoline composition according to claim 11, wherein the one or more $C_6$-$C_{12}$ iso-paraffins is iso-octane.

13. Gasoline composition according to claim 10, further comprising:
(d) one or more $C_4$-$C_5$ paraffins in an amount of 10-35 vol-%, where the $C_4$-$C_5$ paraffins are selected from the group consisting of: iso-pentane, iso-butane, n-butane, and neo-pentane.

14. Gasoline composition according to claim 13, wherein the one or more $C_4$-$C_5$ iso-paraffins is iso-pentane.

15. Process according to claim 1, comprising:
placing the composition into a spark ignition engine.

16. Process according to claim 15, wherein the spark ignition engine is a 2-stroke engine or a 4-stroke engine.

17. Process according to claim 15, wherein the spark ignition engine is part of a portable gasoline powered tool and/or wherein the spark ignition engine has a cylinder displacement of 500 cm³ or less.

18. Process according to claim 15, wherein the spark ignition engine is selected from a group consisting of engines for a: garden tool, forestry tool, chain saw, clearing saw, outboard motor, lawn mower, lawn tractor, string trimmer, snowblower, snowmobile, backpack blower or sucker, water ski, jet ski, motocross, concrete mixers, or generators.

19. A renewable naphtha distillate formed as a renewable component in a small engine gasoline containing a major portion of a small engine gasoline of fossil origin and containing a minor portion of a renewable naphtha distillate, where the renewable naphtha distillate comprises:
90 vol-% or more $C_5$-$C_{12}$ paraffins, of which 30 vol-% or more are $C_5$-$C_6$ paraffins,
5 vol-% or less of naphthenes,
1 vol-% or less of aromatics,
1 vol-% or less of oxygenates, and
wherein a portion of the renewable naphtha distillate is in an amount of 3 vol-% or more, based on total gasoline composition, and wherein a renewable content is determined by isotopic distribution involving 14C, 13C and/or 12C as described in ASTM D6866.

20. A distillate according to claim 19, wherein the renewable naphtha distillate has a boiling point range selected to be within 30-200° C., or within 40-180° C.

\* \* \* \* \*